United States Patent [19]
Watson et al.

[11] 4,453,911
[45] Jun. 12, 1984

[54] BLOW MOLD

[75] Inventors: Keith M. Watson; Floyd L. Jones; Dwight V. Adams, all of Roanoke Rapids

[73] Assignee: W. R. Grace & Co., Duncan, S.C.

[21] Appl. No.: 422,790

[22] Filed: Sep. 24, 1982

Related U.S. Application Data

[62] Division of Ser. No. 307,965, Oct. 2, 1981, abandoned, which is a division of Ser. No. 133,777, Mar. 26, 1980, Pat. No. 4,382,058.

[51] Int. Cl.³ .............................................. B29C 17/07
[52] U.S. Cl. .................................... 425/525; 425/522; 425/535; 425/536; 425/392; 425/395
[58] Field of Search ............. 425/522, 525, 527, 532, 425/535, 536, 392, 395; 264/523, 527, 531, 536

[56] References Cited
U.S. PATENT DOCUMENTS

| | | | |
|---|---|---|---|
| 2,687,157 | 8/1954 | Cowan | 150/0.5 |
| 3,162,707 | 12/1964 | Scott | 264/98 |
| 3,317,955 | 5/1967 | Schurman | 425/526 |
| 3,327,841 | 6/1967 | Schurman | 206/1 |
| 3,795,265 | 3/1974 | Schurman | 150/0.5 |

FOREIGN PATENT DOCUMENTS

| | | |
|---|---|---|
| 804404 | 1/1969 | Canada . |
| 881806 | 9/1971 | Canada . |
| 54-117566 | 9/1979 | Japan . |
| 879185 | 10/1961 | United Kingdom . |
| 1136613 | 12/1968 | United Kingdom . |
| 1160982 | 8/1969 | United Kingdom . |
| 1167513 | 10/1969 | United Kingdom . |
| 1194991 | 6/1970 | United Kingdom . |
| 1233247 | 5/1971 | United Kingdom . |

Primary Examiner—Jan H. Silbaugh
Attorney, Agent, or Firm—John J. Toney; William D. Lee, Jr.; Joseph P. Harps

[57] ABSTRACT

A blow molded single-walled closable container having a compression molded hinge portion is produced by closing a blow mold with a restricted central portion about a parison so as to form two hinge portions and severing the thus formed article into two sections with each of the sections forming a closable container having a top portion and a bottom portion connected by a hinge portion.

4 Claims, 10 Drawing Figures

BLOW MOLD

This is a division of application Ser. No. 307,965, filed Oct. 2, 1981, now abandoned, which is a division of application Ser. No. 133,777, filed Mar. 26, 1980, now U.S. Pat. No. 4,382,058.

BACKGROUND OF THE INVENTION

This invention relates generally to the art of blow molded containers and the molding thereof and more particularly to the art of forming a single-walled blow molded container having an integral hinge portion.

Single-walled thermoplastic containers have been produced in the prior art by utilizing injection molding techniques. Molds for injection molding processes are considerably more expensive and complex than molds utilized for blow molding since a mold surface is required for every surface of the resulting injection molded article. An example of such prior art injection molding is described in U.S. Pat. No. 2,687,157 to Cowan.

U.S. Pat. No. 3,795,265 to Schurman et al describes a process of producing a double-walled container having an integral hinge. In an aspect of the invention disclosed therein, there is provided a container having a body part and a cover part joined by a hinge continuous with each of them and connecting them for opening and closing the container. The body part, cover part and hinge are formed from a single plastic tubular member. The hinge is a pressed and fused laminate of two webs formed from opposite sides of the tubular member. The hinge is thinner than the adjacent wall area of the body part and the cover part, as a result of the pressing and the pinching of the hinge during its formation.

The method described by Schurman et al involves the use of an unrestrained parison and a mold having male mold parts that make a substantial entry into the mating female mold parts. The method includes extruding the parison, positioning the unrestrained parison in the mold, closing the mold on the parison until the male mold parts project substantially into the mating female mold parts deforming the parison between them into the general configuration of the finished molded parts and inserting a blow needle through the wall of the parison and expanding the parison by providing a pressure differential between the inside and the outside of the parison by blowing a pressurized fluid into the interior of the parison thus forcing the parison into the detailed configuration of the closed mold.

The mold has two mold cavities, each of which has male parts that make a substantial entry into the mating female mold parts. The two cavities are joined by land surfaces that register in closely spaced opposed relation when the mold is closed. The tubing which forms the parison, is closed at opposite ends and pinched upon itself intermediate its ends and compression molded at its intermediate pinched area between the land surfaces forming a hinge separating the tubing into a pair of hollow compartments. The mold is closed on the tubing until the male mold parts of each of the mold cavities project substantially into their respective mating female mold parts pressing the respective tubing compartment between them into the general configuration of the finished molded parts. A blow needle is inserted through the wall of each tubing compartment section and each of the respective tubing compartments is forced into the detailed configuration of its respective closed mold cavity.

While the product described in the above referenced Schurman et al patent provides an excellent double-walled container with an integral hinge, it is not always necessary for a container to have the double-wall construction described therein.

SUMMARY OF THE INVENTION

It is thus an object of this invention to provide a single-walled blow molded container having a top portion and a bottom portion connected by an integral hinge portion.

It is a further object of this invention to provide a process of producing a single-walled blow molded container having an integral hinge compression molded during the process of blow molding.

It is a further object of this invention to provide a blow molding apparatus having the capability of forming single-walled blow molded containers with a compression molded hinge portion.

These as well as other objects are accomplished by providing a mold having mateable first and second mold sections with an upper major cavity and a lower major cavity connected by a minor cavity which necks between the major cavities. The process is carried out by inflating a parison so as to conform to the geometry of both major cavities. This resulting article is severed about its circumference to form two sections with each of the sections forming a closable container and comprising a top portion and a bottom portion connected by the hinge portion formed in the minor cavity area. In a preferred embodiment of the invention, a hinge bar is inserted through the mold sections within the minor cavity area prior to the closing of the molds so as to compression mold a hinge on either side of the hinge bar.

DETAILED DESCRIPTION

Figure 1:
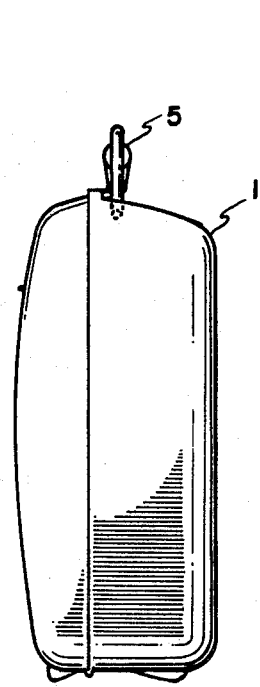
FIGS. 1 and 2 represent a container or case in accordance with this invention in two differing views.
Figure 2:
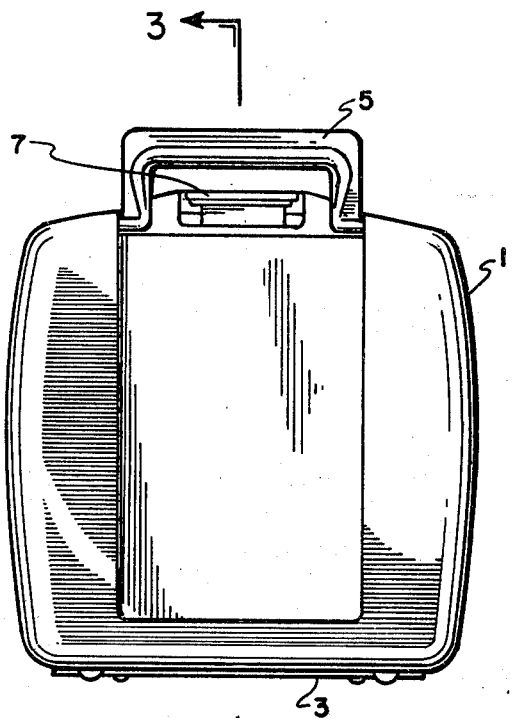
Figure 3:
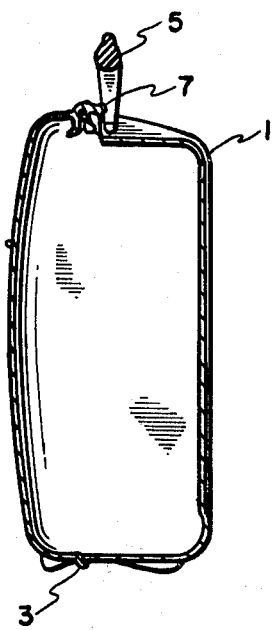
FIG. 3 is a view along the line 3—3 of FIG. 2.
Figure 4:
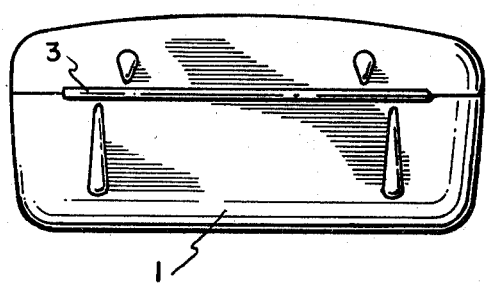
FIG. 4 is a bottom view of the FIG. 2 illustration.
Figure 5:
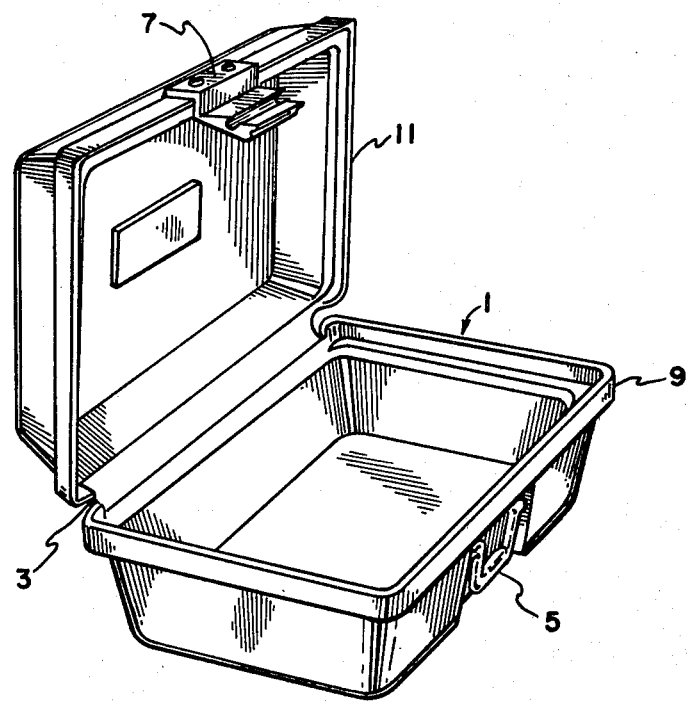
FIG. 5 is an oblique view of an open container in accordance with this invention.

In accordance with this invention, it has been found that blow molded single-walled containers may be provided with a unitary hinge by blow molding a parison into an appropriate configuration which is subsequently severed in order to provide two such containers. FIG. 1 of the drawing illustrates a side view of such a container 1. FIG. 2 is a side view thereof. FIG. 3 is a cross-section view along the line 3—3 of FIG. 2 to illustrate the unitary wall construction thereof. FIG. 4 is a view illustrating the hinge portion 3 of the container 1. As is seen therein, the container case may be optionally equipped with handle 5 and latch 7. FIG. 5 of the drawings illustrates an oblique view of container 1 in an opened position. The bottom portion 9 and top portion 11 are readily viewable as being connected by hinge portion 3. Various aspects and advantages of the invention become apparent upon reading the remaining specification with reference to the various figures of drawings.

Figure 6:
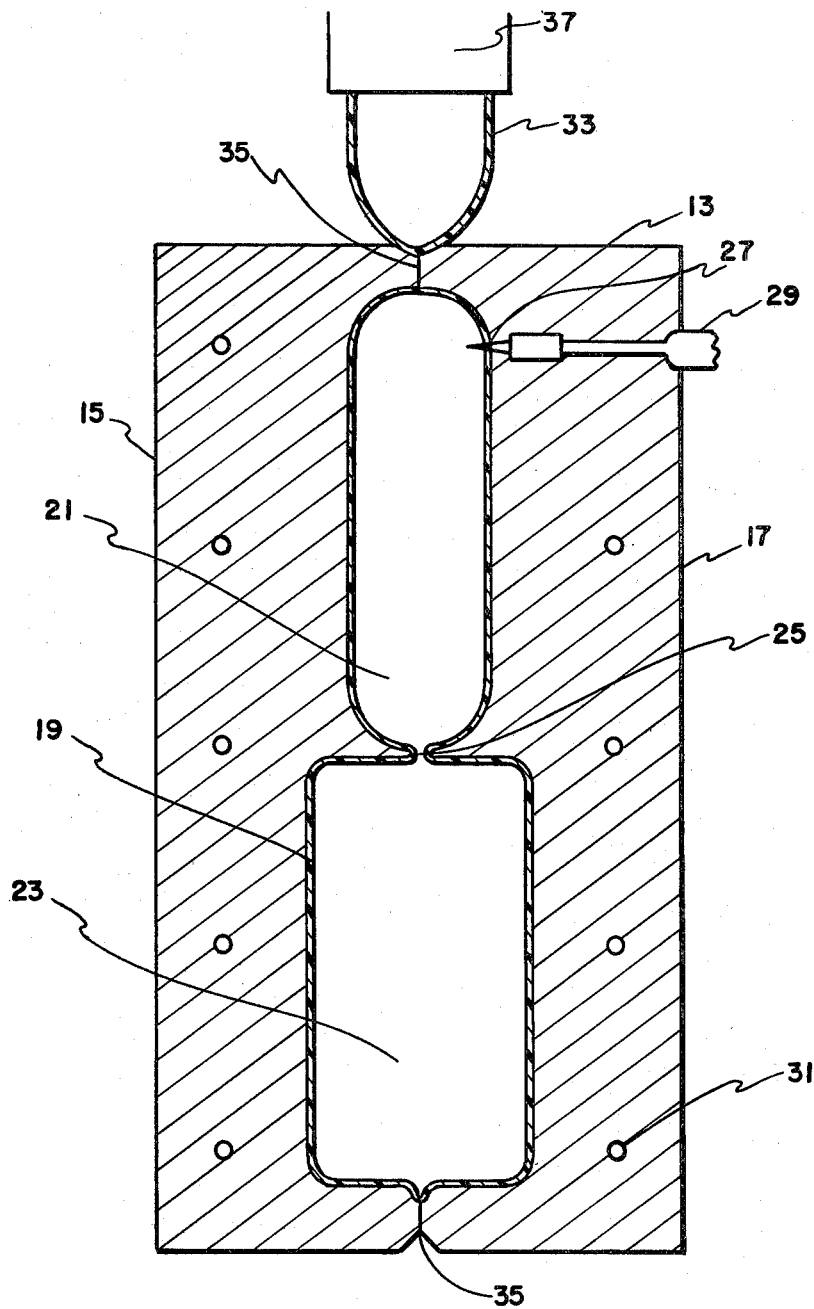
FIG. 6 is a cross-section view of a blow mold in accordance with this invention.

FIG. 6 illustrates a cross-section of a mold operated in accordance with this invention. The mold 13 comprises a first mold section 15 mateable with a second mold section 17 so as to enclose a parison 19 therebetween. The mold sections when mated define a first major cavity 21 and a second major cavity 23 connected by a minor cavity 25. The mold is also equipped with a blow needle 27 communicating with a source of pressurized fluid as is conventional within the blow molding art. The molds are also equipped with temperature maintaining means 31 conventional to the art for the purpose of maintaining the mold sections at an appropriate temperature. The mass of thermoplastic material 33 represents the remaining tubular portion after being pinched by mold sections 15 and 17. The section 33 communicates with extruder 37.

It is seen that when the parison resulting from the blow molding operation of FIG. 6 is severed about the parting line of mold sections 15 and 17 (at 35 and 35') that the portion of the resulting article formed in major cavity 21 forms two tops while the section in major cavity 23 forms two bottoms which are connected by the neck portion formed in the minor cavity 25. For purposes of this specification, the terms "top" and "bottom" when referring to the container (or case) produced in accordance with this invention are used for reference purposes only and are not intended to imply any limitations with regard to altitude or elevation.

The preferred embodiment comprises means 39 for introducing a hinge bar 41 into the parison just prior to the closing of the mold sections. The hinge bar 41 penetrates the parison 19 and upon the closing of the sections 15 and 17, compression molds a hinge on either side thereof between sections 15 and 17 within the minor cavity 25. The compression molded hinge portions is of thinner construction than the remaining blow molded section thus providing the desirable flexibility within the hinge portion. In the embodiment of this invention not utilizing the hinge bar, the portion is of substantially the same thickness as the adjacent blow molded portions and thus not as flexible as a hinge produced by compression molding.

Figure 7:
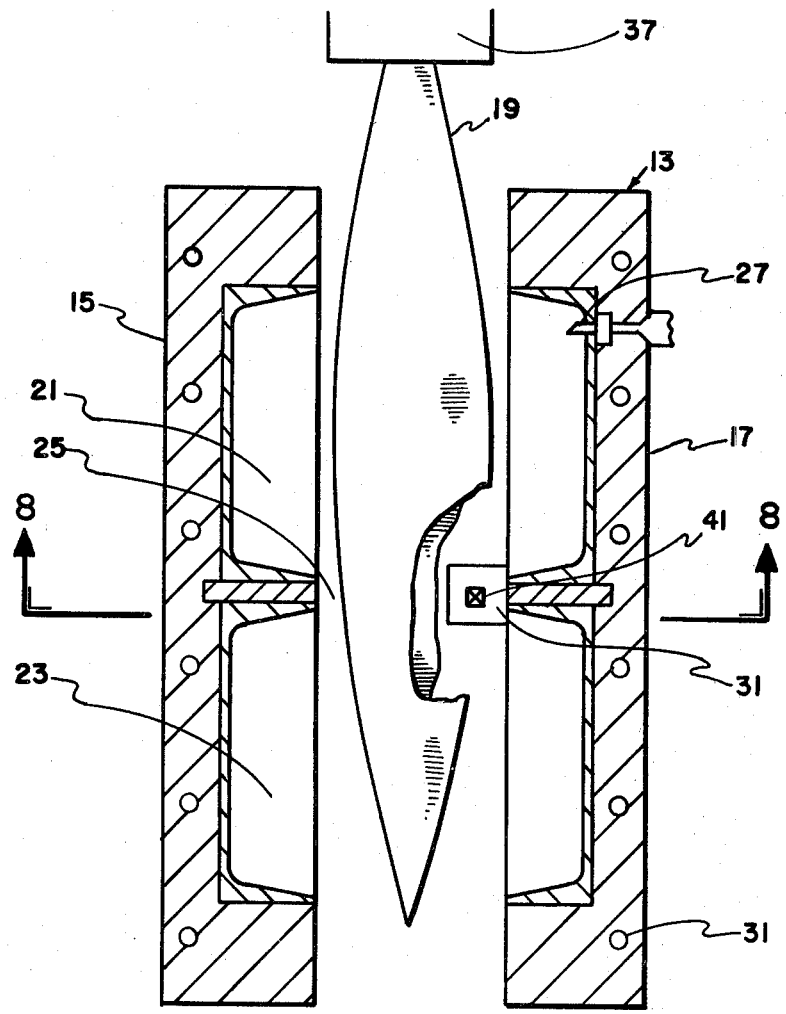
FIG. 7 is also a cross-section view of a blow mold in accordance with an embodiment of this invention.
Figure 8:
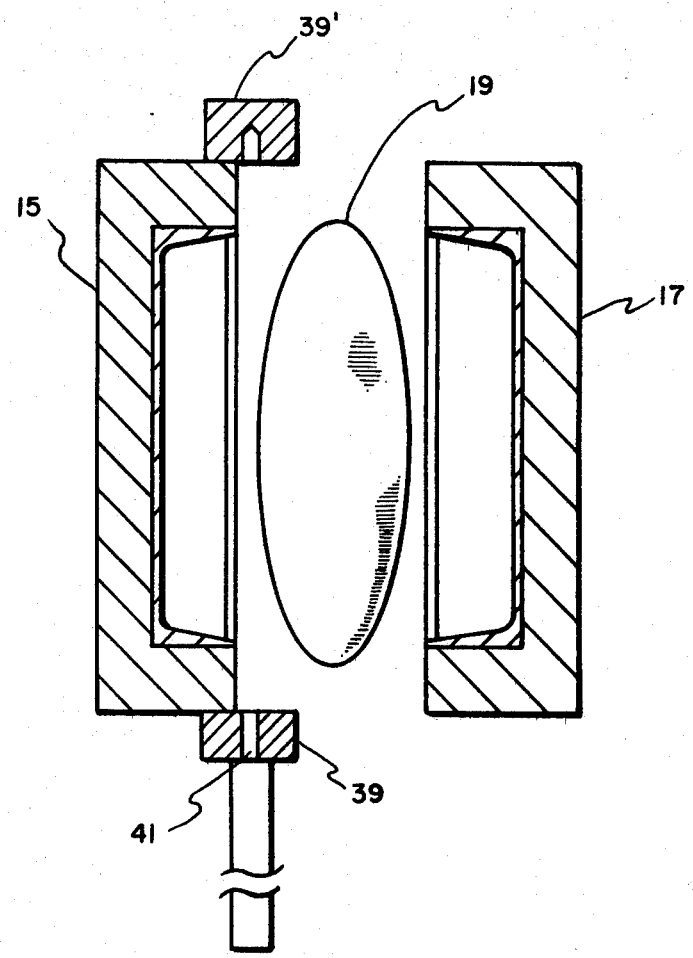
FIGS. 8 through 10 represent views along the line 8—8 of FIG. 7 showing the process of this invention at various stages of progression.
Figure 9:
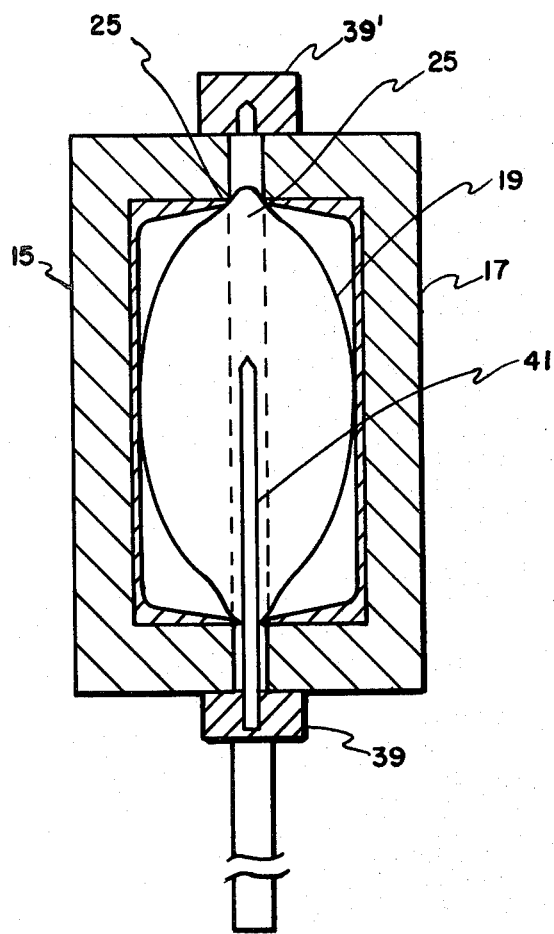
Figure 10:
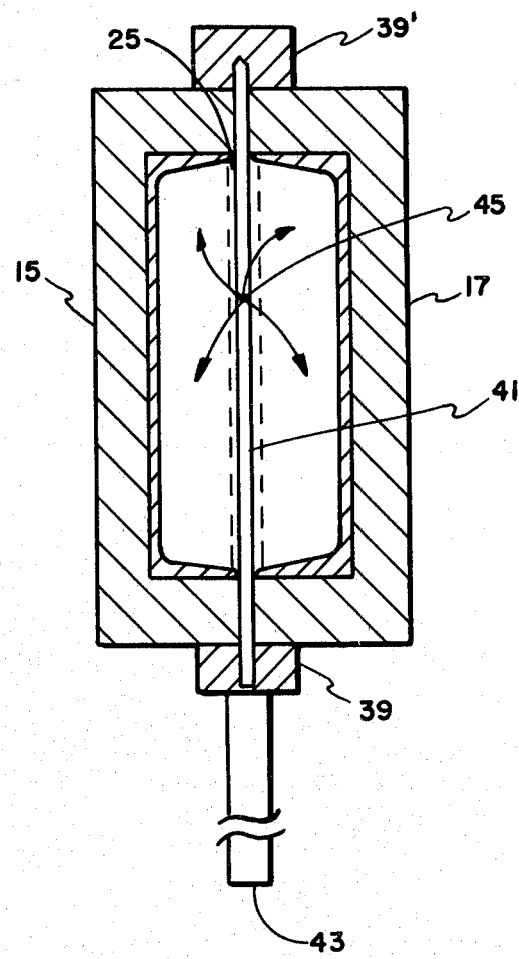

The operation of the hinge bar 41 may be better understood by referring to FIGS. 8, 9 and 10 which represent a cross-section on line 8—8 of FIG. 7 showing the hinge bar 41 at various stages of progression through the minor cavity 25 as the mold sections 15 and 17 close around parison 19. It is preferred that the hinge bar 41 be substantially entirely through the parison just prior to the final closing of the mold so as to compression mold the thermoplastic material between the hinge bar 41 and mold sections 15 and 17 within the area defining the minor cavity 25. The means 39 for introducing the hinge bar and 39' for receiving the hinge bar are preferrably spring biased to the mold section to which they are attached. Thus, means 39 and 39' are resiliently attached to mold section 15 and offset from the final position when the molds are in there unnested locations. Thus, upon the closing of mold sections 15 and 17, the hinge bar 41 penetrates the parison 19 and is received by means 39'. The movement of mold section 17 and 15 toward one another moves means 39 and 39' as well as hinge bar 41 toward mold section 15 thus simultaneously compression molding the thermoplastic material between the hinge bar and the mold sections 15 and 17.

An optional but also preferred feature is illustrated in FIG. 10 wherein hinge bar 41 communicates with a source of pressurized fluid 43 through upper and lower apertures 45 for the purpose of blow molding the parison sections within the major cavities. This source of pressurized fluid may be the exclusive source of fluid or may operate in conjunction with the blow needle 27 previously described. The communicaton of source of pressurized fluid through the hinge bar 41 is preferred to the use of a blow needle because of the large volume of fluid which may be carried through the hinge bar in a short period of time.

In actually carrying out the process, a conventional extrusion source is utilized such as 37. Any blow moldable thermoplastic material having the requisite flexibility for the hinge may be utilized. Such materials include high density polyethylene, polypropylene, polyvinyl chloride and as to vary the wall thickness of various portions of the parison so as to minimize any effects of sagging. Such techniques are well known in the art.

Initially, the parison 19 as shown in FIG. 7 is suspended between opened mold sections 13 and 15. While the parison 19 is shown as a closed tubular form in FIG. 7, it is understood that the initial start up form would be an open tubular form which would then be closed by the closing of the mold sections 15 and 17. Once the parison has passed the full extent of the lower major cavity 23 the mold sections 15 and 17 move into mating position. Just prior to the mold section arriving at the mated position, hinge bar 41 penetrates the parisonand crosses the minor cavity 25 to be received within the hinge bar receiving means 39' oppositely positioned from its counterpart 39 on the insertion side of the mold. Upon the meeting of mold sections 15 and 17, the hinge bar 41 will be substantially in place within the receiving means 39'. Simultaneously with the closing of the molds, the source of pressurized fluid 43 begins communication with aperture 45 to inflate the parison within both the major cavities 21 and 23 while the hinge portion has been compression molded between the hinge bar 41 and mold sections 15 and 17. It is understood that the mold sections are equipped with apertures for venting so as to permit the expansion of the parison within the cavity and optionally but preferrably suction means associated with such vent apertures in areas where needed, e.g., near the hinge mold area so as to prevent the collapse of the parison upon the movement of the opposite sides thereof within the minor cavity 25.

After forming the hinge portion and inflating the parison so as to conform to the geometry of the major cavities 21 and 23, the mold is opened and the hinge bar removed from the thus formed article. The article is then severed symetrically along the parting lines of the molds as shown at 35 and 35' in FIG. 6. This severing step is carried out about the entire circumference of the article and crosses the openings formed by the penetration of hinge bar 41 as it passes from insertion means 39 to receiving means 39' of the mold sections. The act of severing forms two sections from the molded article with each of the sections forming a closable container having a top portion and a bottom portion connected by a hinge portion as is illustrated in FIGS. 1 through 5 of the drawings. The container may optionally be further equipped with a handle such as 5 or latch such as 7 illustrated in FIG. 3 of the drawings.

The container or case provided by this invention may be equipped with optional inserts in order to attractively house an article both for purposes of marketing, protection and storage of an appropriate article. Optionally, however, the container or case provided by this invention may be utilized as a utility case for any purpose such as a suitcase.

A preferred aspect of this invention comprises the contouring of the tops and bottoms of the container so as to conform to the geometry of an article to be housed within the container, e.g., a power drill. Since the container is single-walled, the contouring provides an immobilizing shleter for the housed article on the interior of the container and a readily visible means of identification on the exterior of the container.

It is thus seen that by this invention, a single-walled blow molded container having a compression molded hinge portion is provided. This invention further provides a process of forming a single-walled blow molded container having a compression molded hinge formed simultaneously with the process of forming the blow molded portions. It is additionally seen that this invention provides an apparatus for carrying out such a process incorporating a hinge bar into a blow mold for the purpose of compression molding a hinge area within the blow mold. As many variations will be apparent to those of skill in the art from a reading of the above specification, which is exemplary in nature, the spirit and scope of the present invention is to be measured only as set forth in the following appended claims.

What is claimed is:

1. A blow mold comprising first and second mateable mold sections adapted to define, when mated together:
   an interior comprising upper and lower major cavities connected by a minor cavity which necks between said major cavities;
   a hinge bar insertable through said mold sections and through said interior wherein passage of said hinge bar through said interior is limited to said minor cavity;
   whereby said hinge bar and portions of said first and second mold sections which define said minor cavity are adapted to compression mold a a portion of a parison between said first mold section and said hinge bar and said second mold section and said hinge bar.

2. The blow mold in accordance with claim 1 further comprising a hinge bar adapted to communicatively connect said interior with a source of pressurized fluid.

3. A blow mold comprising:
   first and second mateable mold sections adapted to define, when mated together, upper and lower major cavities connected by a minor cavity which necks between said major cavities;
   a hinge bar insertable through said mold sections and said minor cavity whereby said hinge bar and the portions of said mold sections which define said minor cavity are adapted to compression mold a portion of a parison located between said hinge bar and said mold sections; and
   means for inserting said hinge bar resiliently attached to and spaced from one of said mold sections adjacent said minor cavity whereby said means for inserting said hinge bar and said hinge bar are moved toward said one of said mold sections during the mating of said first and second mold sections.

4. The blow mold according to claim 3 further including means for receiving said hinge bar resiliently attached to said one of said mold sections on the opposite side of said minor cavity from said means for inserting.

* * * * *